Nov. 1, 1966

W. S. TAYLOR ETAL 3,282,115

METHOD OF MEASURING THE PERCENT OF FAT IN ANIMAL TISSUE

Filed Feb. 7, 1964

PORK MIX
50°F. 80 P.S.I.

LOWER G.
HIGHER T.

HIGHER G.
LOWER T.

SPECIFIC GRAVITY

% FAT

INVENTORS.
WILLIAM S. TAYLOR
ROBERT C. WHITEHEAD JR
BY *Arthur H. Swenson*

ATTORNEY.

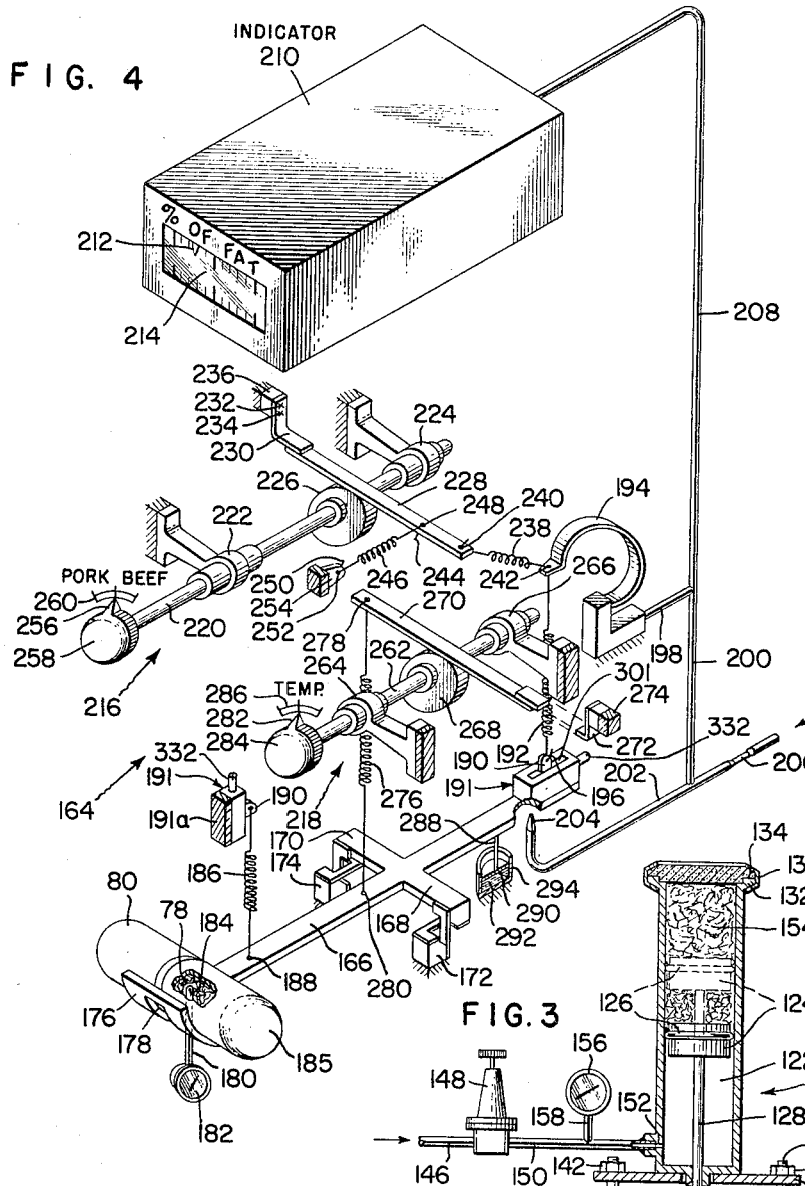

3,282,115
METHOD OF MEASURING THE PERCENT OF FAT IN ANIMAL TISSUE
William S. Taylor, Drexel Hill, and Robert C. Whitehead, Jr., Oreland, Pa., assignors to Honeywell Inc., a corporation of Delaware
Filed Feb. 7, 1964, Ser. No. 343,270
3 Claims. (Cl. 73—432)

It is an object of the present invention to disclose an apparatus for measuring the percentage of fat in a mixture.

Recent public health programs have made us all aware of the harmful, overworked heart condition that is brought about when we consume too great a quantity of fat. Thus, it has become imperative that food processors keep the consumers of their products informed of the precise amount of polysaturated, polyunsaturated or other types of fats and associated carbohydrates that are contained in the food products that they manufacture.

It is also imperative that the food processor maintains the percentage of fat in the food that he is manufacturing at a substantially-fixed level so that the high quality taste and uniform consistency of this product will be maintained throughout the entire manufacturing process and subsequent processes.

Prior to the present disclosure, it had been the practice, when a chemist desired to take a fat measurement of a food product, to first take a small sample of this food product from the food process unit. The sample was then taken to his laboratory where he added chemicals and/or heat to the food sample in order to allow the fat to be poured in liquid form into a calibrated graduate so that the volume of the fat in the food product sample could be observed.

It is another object of the present invention to provide an apparatus that will enable a manufacturer of any product containing fat to guarantee to a consumer of his product a greater degree of accuracy in the fat content of his product than has heretofore been possible.

It is another object of the present invention to provide a way of utilizing, to a greater extent than has heretofore been possible, the maximum amount of fat that a manufacturer is permitted by law to introduce into his product without altering the high quality, taste and appetizing color appearance of his product.

It is another object of the present invention to employ an apparatus for more accurately and rapidly measuring the fat in food products than is possible when the aforementioned, time-consuming, quantitative analysis that is involved in the addition of chemicals and heat to the food product sample is used.

It is another object of the invention to provide the aforementioned, fat-measuring apparatus with a constant, displacement, food-compressing means which will allow substantially all of the entrained air in the food to be expelled from the food as the food is compacted into the desired compressed state.

Another object of the present invention is to disclose a fat-measuring apparatus of the aforementioned type that is constructed to compress a fixed volume of the food product containing fat, such as the fat contained in a meat-fat mixture, into a preselected, compressed state while allowing entrained air in the mixture to escape and then indicating the percentage of fat in the compressed food product by measuring the weight of this food product on a uniquely-constructed weighing means.

It is still another object of the present invention to disclose a different, preferred form of the aforementioned fat-measuring apparatus that is constructed to compress any selected volume of the food product containing fat, e.g. the fat in a meat-fat mixture, into a preselected compressed state while allowing entrained air in the mixture to escape and then indicating the percentage of fat in the compressed food product by measuring the weight of this food product on a uniquely-constructed weighing means.

It is still another object of the present invention to provide the aforementioned fat-weighing means with an adjustable, dial-actuated linkage to apply a first selected magnitude of input force thereto in accordance with the temperature of the food product whose fat content is being measured.

It is another object of the present invention to provide the aforementioned fat-weighing apparatus with an adjustable, dial-actuated linkage to apply a second, selected magnitude of input force thereto in accordance with the characteristic physical ingredients that are contained in the food product whose fat content is being measured by this apparatus.

More specifically, it is another object of the invention to provide a unitary, weight-measuring apparatus containing the aforementioned temperature and food ingredient correcting dial-actuating linkage, which apparatus may be adjusted to measure the percent of fat in, e.g. any one of a number of meat-fat mixtures.

A better understanding of the present invention may be had from the following detailed description when read in connection with the accompanying drawings in which:

FIG. 3 shows a fluid-actuating unit for compressing any one of a number of different selected volumes of fatty foods into any one of a number of different select compressed conditions;

FIG. 4 shows an apparatus for weighing the aforementioned fatty materials in their compressed state and thereby indicating the percentage of fat therein;

FIG. 6 shows a spring force adjusting unit that can be used to advantage in the measuring apparatus shown in FIG. 4 when it is of any one of a number of different volumes of a material containing fat, and FIG. 7 is a sectional view taken along the line 7—7 of FIG. 6.

Figure 1:
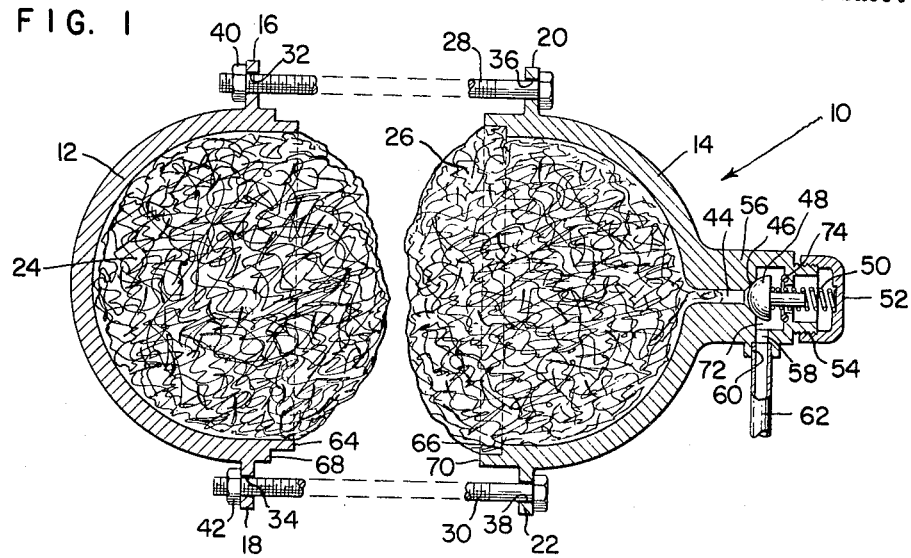
FIG. 1 shows two hemispheres inside of and between which a predetermined, fixed amount of a fatty material such as food can be manually or hydraulically compressed.

The compression chamber 10, shown in FIG. 1, is comprised of two hemispheres 12, 14. Each of the hemispheres 12, 14 is shown containing a suitable number of flanges 16, 18 and 20, 22. A first gob 24 of a material whose fat content is to be determined is inserted in a snowball fashion as shown in the hemisphere 12 when it is in a vertical position, and a second gob 26 of material is similarly inserted in the hemisphere 14.

FIG. 1 also shows tie bolts 28, 30 passing through apertures formed by the inner wall surfaces 32, 34, 36, 38. Nuts 40, 42 are shown threadedly mounted on their associated left ends of each of the tie bolts 28, 30.

The right end of the hemisphere 14 is provided with a passageway 44 and a valve seat 46 against which a plug 48 is shown in engagement. The elongated end of the plug 48 is shown retained in this position by means of a coil spring 50 whose right end is shown in engagement with a screw cap 52. This screw cap 52 is threadedly connected at 54 with a cylindrical right end of the hemisphere 14.

The embossed right end 56 of the hemisphere 14 has an exhaust passageway 58 formed therein that is aligned with and joined by a threaded connection at 60 to conduit 62 which, in turn, is shown having its other end exhausted to atmosphere.

The gobs of material 24, 26 whose fat content is to be measured will be brought into contact with one another in a single compressed mass when the nuts 40, 42 are tightened and the complementary, cylindrical end surfaces 64, 66 and 68, 70 of the hemispheres 12, 14 are brought into engagement with one another. As the material 24, 26 is compressed in this manner, some of this material will be immediately forced out of the openings formed between the inner ends of the hemispheres 12, 14.

As the material 24 is further compressed into a more compressed state, the material will be forced through the passageway 44, against the plug 48, into passageway 72 and out through conduit 62.

As this overflow occurs, the spring-biased plug will be forced, by the material being compressed, away from its seat toward its fully-opened position, and the right end of same will be brought into engagement with the flexible O-ring 74.

The compression spring 50 is made of a preselected strength so that the plug 48 will only allow the material being compressed between the hemispheres 12, 14 to pass from passageway 44 into passageway 72 and conduit 62 until the material under compression is lowered to a desired compressed state and fixed volume. Under this condition, substantially all of the entrained air will be removed from the material. The spring force that the spring 50 exerts on the plug 48 can be varied by manual rotation of the cap 52.

Figure 2:
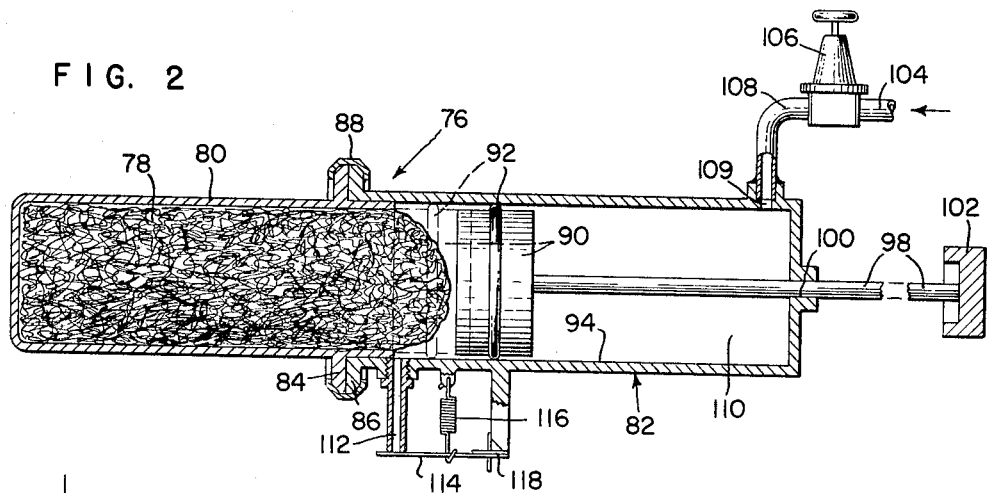
FIG. 2 shows an opened-end can into which a predetermined, fixed amount of the aforementioned fatty material can be compressed.

FIG. 2 shows another compression chamber 76 for compacting a gob of material 78, whose fat content is to be determined, into a container 80 by means of a fluid-actuated piston unit 82.

The circular flange 84 of the container 80 is shown clamped in physical surface-to-surface, fluid-tight contact with the flange 86 of the piston unit 82 by means of any one of a number of sanitary, readily-dismountable, commercially-available toggle or threadedly-adjusted clamps 88.

The piston unit 82 contains a piston 90 having a resilient, O-shaped piston ring 92 that is press-fitted in a fixed position on the outer, peripheral, grooved surface of the piston 90.

The diameter of the outer, peripheral surface of the piston ring 92 is selected so that a fluid-tight joint is formed between the piston ring 92 and the inner wall surface 94 of the piston unit 82 when the piston is moved from its solid-line position to its dotted-line position or vice-versa.

The piston rod 98 is shown passing through a bearing surface 100 located at the right end of the piston unit 82. A knob 102 is provided at the end of the rod 98 for adjusting the piston 90 to selected locations along the piston wall surface 94.

A fluid under pressure from a fluid pressure generating source, not shown, is applied in the direction of the arrow through conduit 104, the pressure regulator 106 and the conduit 108, through passageway 109 into the right end of the chamber 110 of the piston unit 82.

In the operation of the apparatus shown in FIG. 1, a gob of material 78 is placed into the container 80, as shown, with a small amount protruding over its open right end. The flanges 84, 86 are then clamped in fluid-tight engagement by means of clamp 88. The pressure regulator 106 is then moved from its closed to its open, high, fluid pressure, delivery position to allow the fluid under pressure to flow in the direction of the arrow from the fluid pressure source, not shown, through the conduits 104, 106 and passageway 109 to the chamber 110, to apply a force to the piston to move it from its solid-line position to its dotted-line position.

Movement of the piston in the afore-mentioned manner will thus enable the material 78 to be compressed. As the piston 90 is moved from its solid-line to its dotted-line position, any entrained air that is present in the material will, along with a portion of the excess material 78, be forced into the atmosphere exhaust passageway 112 and against the flapper 114. When the force exerted by the material is of a sufficient magnitude to overcome the force of spring 116, the flapper 114 will be forced to rotate in a counter-clockwise direction about the flexible pivot 118 and the material 78 will be expelled as waste to atmospheric pressure.

The material 78 will thus be compressed to the same preselected compressed state for any selected position of the pressure regulator 106, regardless of the amount of the material that is allowed to extend from the right open end of the container 80.

FIG. 3 shows a unitary container—fluid actuating unit 120—that contains chamber 122, a piston 124, a piston ring 126, a piston rod 128 and a piston rod guide bearing 130 that are similar to the same parts previously described under the description of FIG. 2.

The upper end of the chamber 122 has a circular flange 132 integral therewith and a removable, porous, circular cap 134 in physical surface-to-surface contact therewith. The flanges 132 and plug 134 are shown clamped into fluid-tight engagement by means of any suitable, commercially-available clamp 136. The lower end of the chamber 122 of the fluid actuating unit 120 is fixedly mounted on the top of the base plate 137. The base plate 137, in turn, is supported in a fixed position on the top of a suitable number of stationary support rods 138, 140 and retained in a fixed position thereon by means of the nuts 142, 144.

A fluid under pressure from a fluid pressure generating source, not shown, is applied in the direction of the arrow through the conduit 146, the pressure regulator 148, the conduit 140 and the passageway 152 into the lower end of the chamber 122.

In the operation of the apparatus shown in FIG. 3, a gob of material 154 is inserted through the top of the fluid actuating unit 120 into the chamber 122. The flanges 132, 134 are then clamped into fluid-tight engagement by means of the clamp 136. The pressure regulator 148 is then moved from its closed to open high fluid supply delivery position to allow the fluid under pressure to flow from the fluid pressure source, not shown, through the conduits 146, 150, passageway 152 into the chamber 122 to apply a force to the piston 124 to move it from its solid to its dotted-line position. Movement of the piston 124 in this manner will thus enable the material 154 to be compressed. As the piston 124 is moved from its solid to its dotted-line position, any entrained air that is present in the material itself or which remains in any void that may be formed between the material and the, e.g. upper, undersurface of the porous plug 134, will be forced out through the multiplicity of minute holes formed in this plug 134 and exhausted to the atmosphere.

The material 154 will thus be compressed to any one of a number of preselected compressed states which will be determined by the fluid pressure setting on the pressure regulator 148. The magnitude of this fluid pressure, which the pressure regulator delivers for different settings of the regulator, is indicated on the gage 156 that, in turn, has passageway 158 connecting it to conduit 150.

The volume to which the material 154 is compressed when the piston 124 is moved from a solid to a dotted-line position will be the volume measurement that is indicated on the scale 160 opposite the dotted-line position of the pointer 162.

When the aforementioned gob of material 154 has been compressed to the aforementioned desired, de-aerated state, the clamp 136 and the porous cap 134 are removed and the compressed material 154 is forced out of the upper end of the chamber 132 on to a fat-indicating apparatus 164 by adjusting regulator 148 so air at a higher pressure level can be applied to the underside surface of piston 124.

FIG. 4 shows an apparatus 164 for indicating the percentage of fat that is present in any one of a variety of materials containing fat, e.g. a pork or beef mix.

The fat-indicating apparatus 164 is comprised of a force balance beam 166 having two integral side portions 168, 170 extending therefrom that are, in turn, respectively mounted for rotation about the associated cross spring pivots 172, 174.

The left end of the force balance beam 166 has an integral, arcuate, saddle member 176 extending therefrom. An aperture in the form of a rectangular slot is formed by a central wall portion 178 of the member 176. A temperature-sensing probe 180 extending from a temperature indicator 182 is shown having a temperature-sensing end 184 protruding through the slot 178 into the material 78 in the container 80 whose fat content is to be measured. As previously mentioned, the material 78 contains fatty ingredients therein which are in a compacted state. This container 80 and similar containers 10, 120 have been previously set forth under the description of FIGS. 1, 2 and 3.

The right end of the container 80 is shown containing a pipe plug and cap unit 185 to retain the material within the container 80 in the compressed deaerated state in which it had been placed by the previously-described apparatus.

A suppression spring 186 is shown having one end fixedly attached by brazing material at 188 for movement with the beam 166 and its other hooked end fixedly connected to a lug 190 which is, in turn, adjustably fixed to an adjustable volume unit 191 to be later described that has a stationary left side portion 191a. The purpose of the suppression spring 186 is to perform the function of balancing out the dead weight of the beam 166 and the chamber 80 plus a part of the weight of the material 78 within the chamber 80.

The change in weight of the material within the chamber 80 as the fat content varies from zero percent to one hundred percent is balanced by the spring 192 and Bourdon 194 to which one end of this spring 192 is attached. The other end 196 of the spring 192 is of a hook-shaped construction which, in turn, is fixed to a lug 190 which is connected by one adjustable volume unit 191 to the right end of beam 166, to be described later.

The Bourdon 194 is shown connected by way of passageways 198, 200 to the fluid under pressure in chamber 202. The pressure in the Bourdon will thus be increased when a force is applied to move the underside surface of the beam 166 toward the nozzle 204, and the pressure in the chamber 202 and Bourdon will be decreased when a force is applied to the beam 166 to move it away from the nozzle 204.

A fluid pressure generating source, not shown, is used to supply a fluid pressure to the aforementioned chamber 202 in the direction of the arrow and through the restriction 206. The upper branch end 208 of the fluid passageway 200 is connected to a pneumatically-actuated indicator 210 to move a pointer 212 along a scale 214. This construction will enable the viewer to see an accurate measurement of the percent of fat that is present in the material 78 that is present in the container 80. The pointer 212 of the indicator scale 214 can be moved by any commercially-available, pneumatically-actuated bellows or a series of stacked diaphragm capsules that is employed to actuate a linkage, not shown, that extends between either of these actuating means and the pointer 212.

The aforementioned, described, fat-indicating apparatus is unique in that it employs two, separately-operated, adjustable type, spring-loaded biased units 216, 218 for respectively altering the force applied to the force balance beam 166 in accordance with the physical characteristics of the ingredients of the compressed material in the container 80 and in accordance with the temperature of this material.

By way of illustration, FIG. 4 shows the adjustable spring-biased unit 216 as being comprised of a rotatable shaft 220 which is rotatably mounted in stationary pillow bearing block support members 222 and 224. Fixedly mounted on the shaft 220 between the bearing members 222 and 224 there is shown a cam 226.

The central lower surface of the cantilever beam 228 is shown in physical surface-to-surface contact with the top surface of the cam 226. A flexible L-shaped pivot member 230 which forms an integral left end portion of the cantilever beam 228 is fixedly connected by a brazing material 232, 234, as shown, to a stationary member 236 as shown in FIG. 4.

A spring 238 is shown fixedly connected at one of its ends by a brazing material 240 to the right end of the cantilever beam 228 and connected by suitable brazing material 242 at its other end to the free end of the Bourdon 194.

The right hooked end 244 of another spring 246 is shown extending through a wall portion 248 in the cantilever beam 228 that forms an aperture therein. The other hooked end 250 of the spring 246 protrudes through and into contact with a wall portion 252 forming an aperture in stationary member 254. The spring 246 will thus retain the underside of the cantilever beam 228 in physical contact with the cam 226 regardless of the change in position of the free end of the Bourdon 194 and spring 238.

From the foregoing description, it can be seen that clockwise rotation of the pointer 256 and its associated knob 258, that is fixedly mounted on the left end of the shaft 220, will cause the radial distance between the center of the shaft 220 and the outer periphery of the cam 226, that is in contact with the cantilever beam 228, to be reduced.

In a similar, but opposite, manner it can be seen that counter-clockwise rotation of the knob 258 will cause the aforementioned radial distance between the center of the shaft 220 and the undersurface of the cantilever beam 228 to be raised from the position shown.

Adjustment of the beam 228 in the aforementioned manner will thus alter the angle at which the left end of the spring 238 is displaced with respect to the point at which the brazing material 242 joins the other end of this spring to the free end of the Bourdon 194. It can also be seen that adjustment of the knob 258 in the aforementioned manner will also cause the length of this spring 238 to be altered. The change in angular position and the change in length of the spring 238 will thus cause the characteristic force that the Bourdon 194 per se applies to be altered for each different position of the knob.

By way of an example, it can be seen that when the pointer 256 is positioned at the left end of the scale 260, a characterized biasing force will be introduced into the force-balance beam 166 of the weighing apparatus 164 that will enable it to directly measure the fat content in pork or some other similar characterized, compressed, fatty material 78 that is selected for insertion in the container 80.

When the pointer 256 of the knob 258 is aligned with the right end of the indicating scale 260, then it will enable the apparatus to directly measure the fat content of beef or some other similar, characterized, compressed, fatty material that is selected for insertion in the container 80.

FIG. 4 also shows the previously-referred-to, spring-biased unit 218 for altering the force applied to the force balance beam 166 in accordance with the temperature of the meat in the container 80, as is indicated on the gage 182.

This spring-biased unit 218 is comprised of a shaft 262 rotatably mounted in stationary pillow bearing block support members 264, 266. Fixedly mounted on the shaft 262 between the bearing members 264, 266 there is shown a cam 268.

The central lower surface of the cantilever beam 270 is shown in physical surface-to-surface contact with the top surface of the cam 268.

A flexible L-shaped pivot member 272 which forms an integral right end of the cantilever beam 270 is fixedly connected by a brazing material, not shown, to the stationary member 274.

A spring 276 is shown fixedly connected at one of its ends by brazing material 278 to the left end of the cantilever beam 270 and connected by a suitable brazing material 280 at its other end to the force-balance beam 166.

From the aforementioned description, it can be seen that clockwise rotation of the pointer 282 and its associated knob 284 that is fixedly mounted on the left end of the shaft 262 will cause the radial distance between the center of the shaft 262 and the outer periphery of the cam 268 that is in contact with the cantilever beam 270 to be reduced. In a similar, but opposite, manner it can also be seen that counterclockwise rotation of the knob 258 will cause the aforementioned radial distance between the center of the shaft 262 and the undersurface of the cantilever beam 270 to be raised from the position shown in FIG. 4. Thus, the pointer 282 or knob 284 is rotated to the temperature value on the temperature-indicating scale 286 shown on gage 182 so that the correct force can be applied to the beam for the temperature of the material under measurement.

FIG. 4 also shows a piston rod 288 having an upper end fixedly connected by a brazing material, not shown, to the underside of the force balance beam 166 and a lower end which has a piston 290 integral therewith which is mounted for movement in fluid 292 which is retained in a dash pot 294.

Figure 5:
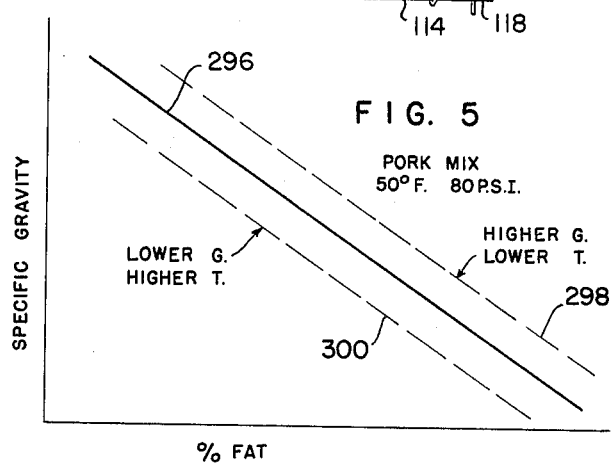
FIG. 5 shows the linear relationship that exists between the specific gravity of fatty foods and the percentage of fat contained therein that it is possible to measure through the use of the compressing and weighing apparatus shown in FIGS. 1–4.

The solid line 296, shown in FIG. 5, represents the common linear relationship that exists between the specific gravity of the fat content of different samples of, e.g. pork, containing minced ham, shoulder pork trim which includes bellies, etc., and jowls.

The dotted lines 298, 300 which are shown above and below the solid line in FIG. 5 indicate that a linear relationship exists between the specific gravity and fat content of this meat when either a higher gravity-lower temperature sample or a lower gravity-higher temperature sample is measured than that shown in the solid line 296, shown in this FIG. 5.

Each of the two previously-described adjustable volume units 191 employed in the fat-indicating apparatus of FIG. 4 is shown in detail in FIGS. 6 and 7. Each of these units 191 has the bottom portion of the previously-described lugs 190 passing through a slotted wall portion 301 which is integral with a nut 302.

The nut 302 is shown threadedly mounted for movement along an adjustable screw shaft 304. The nut 302 also has indicating pointers 306, 308 integral therewith that are in slidable contact with portions of an integrally-connected base plate 310, 312 of the unit 191.

The unit 191, in turn, is fixedly mounted to the stationary plate 191a in one instance and to the top right end surface of the beam 166 in the other instance, as shown in FIG. 4. The surfaces 314, 316 on either side of the base plate 312 have volume indicating scales inscribed thereon which correspond to the volume scale 160 shown in FIG. 3.

The bottom nut 302 is slidably mounted for movement along the upper base surface of the base plate 310. The base plate 310, in turn, has two side plates 318, 320 integral therewith. The plate 318 has a circular wall portion 322 which forms an aperture therein for rotatably supporting the right non-threaded end portion 324 of the screw shaft 304 which, in turn, has a peened end 326.

It can also be seen that, in FIG. 6 of the drawing, the plate 320 also has a circular wall portion 328 therein for rotatably supporting the left non-threaded end 330 of the screw shaft 304.

It can be seen from the aforementioned description that the knurled knob 332 of the screw shaft 330 can be rotated in a clockwise or counter-clockwise manner so that the nut 302 and the pointers 306, 308 can be adjusted in either direction from the position shown to any desired value along the volume scales 314, 316 to the value of the compressed material that is indicated on the scale 160. A wall surface 317 is shown forming an aperture in the side wall of the unit 191.

When an increased volume adjustment from that shown is desired, the knob 332 of one of the adjustable volume units 191 is rotated so that the lug 190 will move the end of the spring 186 in an upward direction from that shown in FIG. 4 so as to alter the magnitude of the force that the spring 186 can apply to the left end of the beam 166. When making this volume adjustment, the lug 190 of the other unit 191 is also positioned to the desired volume setting on scale 314, 316 to the right of the position shown along the beam 166 so as to alter the magnitude of the characterized force that the spring 192 can apply to the beam 166.

It should also be understood that the knob 332 is rotated to make the nut 302 and lug 190 move in the opposite direction from the position shown in FIG. 4 when a decreased volume adjustment is desired.

It can thus be seen that an apparatus is employed to compact any one of a number of random sample volumes of a material containing fat to deaerate it, and to make corrections for the physical characteristics of the compressed ingredients as well as for the temperature and volume of these ingredients so that an accurate measurement of the fat content of different types of materials can be obtained.

What is claimed is:

1. A method to measure the percent of fat in animal tissue, comprising the first step of compressing the tissue to a preselected state, the second step of measuring the volume of said tissue while in said compressed state, the third step of weighing said tissue, and the fourth step of measuring the percent of fat in the tissue by relating the volume of the compressed tissue to its weight.

2. The method defined in claim 1 including a fifth step of measuring the temperature of the animal tissue, and a sixth step of introducing a temperature corrective factor into the volume-weight relationship of said compressed tissue.

3. The method defined in claim 1 comprising an additional step of adjusting the relationship the volume-weight relationship of said compressed tissue in accordance with physical differences that exist between different species of animals from which said animal tissue is derived.

References Cited by the Examiner
UNITED STATES PATENTS

| | | | |
|---|---|---|---|
| 1,767,054 | 6/1930 | Briggs. | |
| 2,211,193 | 8/1940 | Zinke | 177—261 X |
| 2,729,099 | 1/1956 | Rosenthal | 73—73 |
| 2,765,160 | 10/1956 | Dietert et al. | 177—171 |
| 2,777,324 | 1/1957 | Ives | 73—73 |
| 2,889,574 | 6/1959 | Thielen | 17—39 X |
| 3,032,132 | 5/1962 | Ohaus | 177—171 |

OTHER REFERENCES

Kraybill et al., "In Vivo Measurement of Body Fat and Body Water in Swine," Journal of Applied Physiology, vol. 6, No. 1, July 1953. Pages 27–32 relied on.

LOUIS R. PRINCE, *Primary Examiner.*

DONALD O. WOODIEL, *Assistant Examiner.*